(12) United States Patent
Luthi et al.

(10) Patent No.: US 9,136,753 B2
(45) Date of Patent: Sep. 15, 2015

(54) ELECTRIC DEVICE HAVING LOW POWER CONSUMPTION IN THE STAND-BY STATE

(75) Inventors: Daniel N. Luthi, Winterthur (CH); Fabien Maupas, Pontarlier (FR); Yves Theoduloz, Yverdon-les-Bains (CH); Manfred Schlenk, Augsburg (DE); Hans Hoffmann, Augsburg (DE); Mykhaylo Raykhman, Munich (DE); Josef Fisch, Petersberg/Erdweg (DE)

(73) Assignees: Minebea Co., Ltd., Nagano-ken (JP); EM Microelectric-Marin S.A., Marin (CH)

( * ) Notice: Subject to any disclaimer, the term of this patent is extended or adjusted under 35 U.S.C. 154(b) by 331 days.

(21) Appl. No.: 13/582,498

(22) PCT Filed: Mar. 1, 2011

(86) PCT No.: PCT/EP2011/000996
§ 371 (c)(1),
(2), (4) Date: Sep. 4, 2012

(87) PCT Pub. No.: WO2011/107257
PCT Pub. Date: Sep. 9, 2011

(65) Prior Publication Data
US 2012/0319501 A1    Dec. 20, 2012

(30) Foreign Application Priority Data

Mar. 2, 2010 (DE) .......................... 10 2010 009 990
Mar. 2, 2010 (DE) .......................... 10 2010 009 991

(51) Int. Cl.
G05F 1/56    (2006.01)
H02M 1/36    (2007.01)
H02M 1/44    (2007.01)

(52) U.S. Cl.
CPC .. *H02M 1/36* (2013.01); *H02M 1/44* (2013.01)

(58) Field of Classification Search
USPC ......... 323/210, 235, 246, 266, 285, 288–290; 363/21.12–21.18
See application file for complete search history.

(56) References Cited

U.S. PATENT DOCUMENTS

| | | | | |
|---|---|---|---|---|
| 5,396,165 A | * | 3/1995 | Hwang et al. | 323/210 |
| 6,087,802 A | * | 7/2000 | James | 320/104 |
| 6,621,253 B2 | * | 9/2003 | Mendenhall | 323/210 |
| 7,019,992 B1 | | 3/2006 | Weber | |
| 7,358,706 B2 | * | 4/2008 | Lys | 323/222 |

(Continued)

FOREIGN PATENT DOCUMENTS

DE    102009030106 A1  *  12/2010
EP    0349707             1/1990

(Continued)

OTHER PUBLICATIONS

Translation of DE 102009030106.*

*Primary Examiner* — Adolf Berhane
*Assistant Examiner* — Nusrat Quddus
(74) *Attorney, Agent, or Firm* — Volpe and Koenig, P.C.

(57) ABSTRACT

An electrical device, particularly having at least one lighting system having light emitting diodes, such as a television having LED backlighting (57), which has a stand-by mode (ZPM) with very low power consumption in which only one control unit (3) is supplied with power via a capacitive voltage divider. For this purpose, alongside parts of the power supply unit (2), the interference suppression capacitor (6) is also switched off.

20 Claims, 18 Drawing Sheets

(56) References Cited

U.S. PATENT DOCUMENTS

| | | | |
|---|---|---|---|
| 8,351,232 B2 * | 1/2013 | Zhang | 363/89 |
| 8,525,429 B2 * | 9/2013 | Schlenk et al. | 315/224 |
| 2004/0051513 A1 * | 3/2004 | Rupp et al. | 323/288 |
| 2004/0205363 A1 | 10/2004 | Alperin et al. | |
| 2009/0021969 A1 | 1/2009 | Butler et al. | |
| 2010/0165673 A1 * | 7/2010 | Chang et al. | 363/21.17 |
| 2010/0321964 A1 * | 12/2010 | Brinlee et al. | 363/21.18 |
| 2012/0169240 A1 * | 7/2012 | Macfarlane | 315/152 |
| 2012/0299503 A1 * | 11/2012 | Aharon | 315/224 |
| 2013/0188401 A1 * | 7/2013 | Jin et al. | 363/21.17 |

FOREIGN PATENT DOCUMENTS

| | | |
|---|---|---|
| EP | 1598926 | 11/2005 |
| JP | 2000308352 | 11/2000 |
| JP | 2001095261 | 4/2001 |
| JP | 2005050721 | 2/2005 |
| JP | 2005110472 | 4/2005 |
| WO | 2010003785 | 1/2010 |

* cited by examiner

Transition AM to ZPM

Transition ZPM to AM

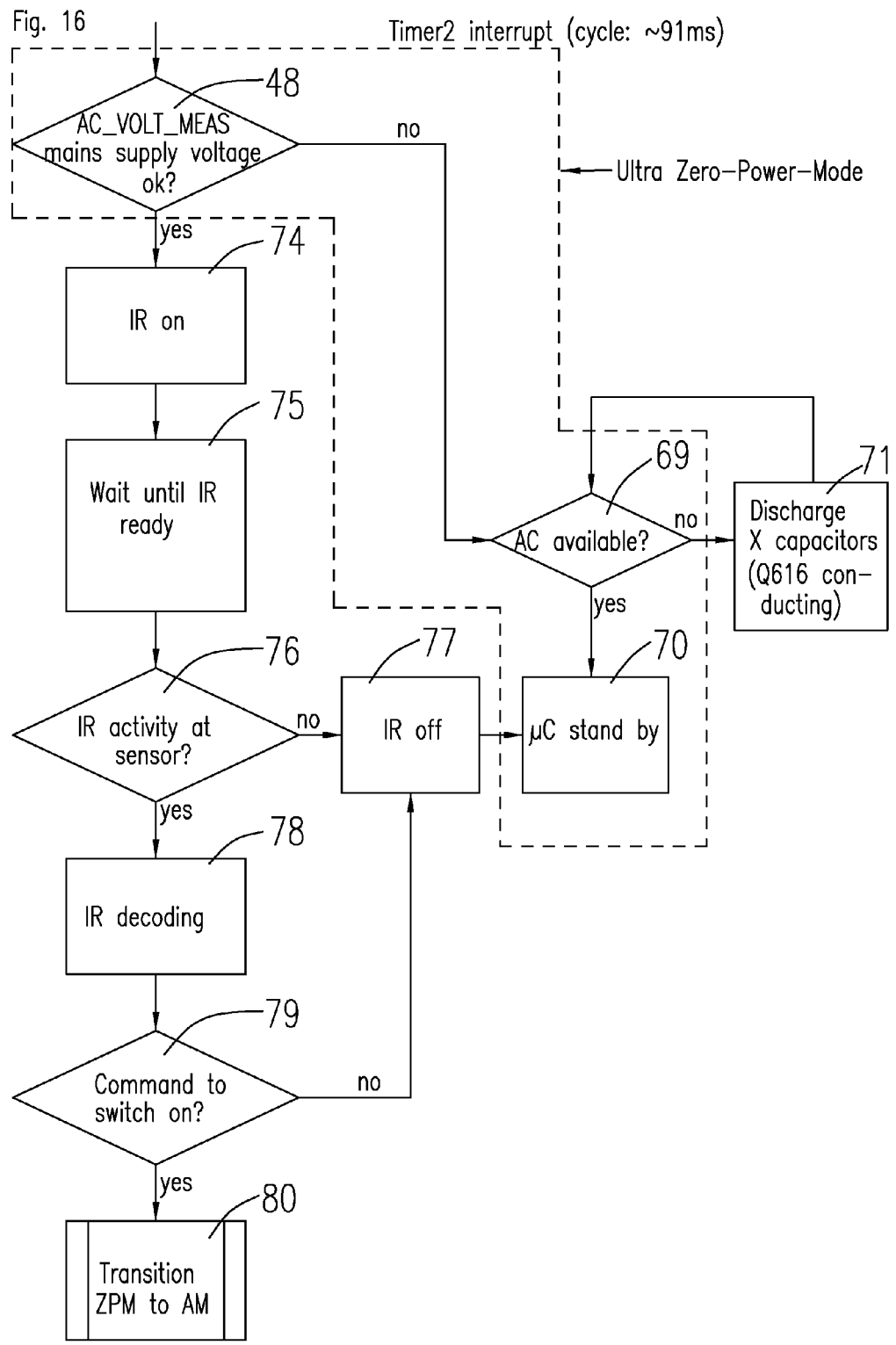

ELECTRIC DEVICE HAVING LOW POWER CONSUMPTION IN THE STAND-BY STATE

BACKGROUND

The invention relates to an electrical device, particularly a television, having a power supply unit that has a voltage converter and an interference suppression capacitor and having a control unit disposed on the primary side that has its own power supply circuit connected directly to the mains voltage and which can be controlled through an external signal, wherein the electrical device has an energy saving mode and the control unit is designed such that when the electrical device enters the energy saving mode, the electrical energy on the secondary side of the power supply unit is switched off.

Electrical devices such as televisions, DVD players, air conditioners and a variety of other devices are usually equipped with a remote control with which the device can be operated and switched off.

To enable the devices to be switched on again using the remote control, the devices remain in a state of operational readiness (stand-by mode) after being switched off.

However, this requires that at least the receiver for the remote control signals and the associated circuit are still supplied with power. In the prior art, the stand-by mode is mainly realized in that the device disconnects the circuit parts that are not needed from the power supply. The power supply unit of the device, however, still remains connected to the mains voltage.

Thus known electrical devices require at least 100 mW in stand-by mode. Mostly, however, power consumption is considerably higher and in worse cases can be as high as several watts. If this kind of device is operated 24 hours a day over 365 days in the year, the electricity costs are not inconsiderable and a not inconsiderable amount of energy has to be permanently available to supply the stand-by mode of a large number of these devices with power.

Hence in the prior art, many attempts have been made to reduce the power consumption of electrical devices in stand-by mode.

A known system, for example, uses relays that disconnect the primary power supply between the mains connection and the power supply unit. This kind of device can be switched off using the remote control. Since the relays interrupt the entire power supply, there is no energy at all available for a remote control receiver and the device has to be manually switched on again using a switch on the device.

Another known system also uses relays to disconnect the power supply from the mains. A remote control receiver, through which the device can be switched on, is supplied with power through a capacitor (Gold Cap) that is charged during normal operation. However, the Gold Cap has only limited capacitance which is not sufficient for bridging long switch-off periods.

Other systems draw power for the signal receiver from external sources, such as from a mains cable or a signal cable from an external energy source, such as a computer or DVD player.

From WO 2010/003785 A2, an electrical device is known that has a stand-by mode having considerably lower power consumption. This is achieved in that the power supply on the secondary side is switched off and on the primary side only a signal receiver and a control unit are supplied with power directly from the main grid. The control unit switches the energy supply on the secondary side of the power supply on or off according to the signals the control unit receives. This makes it possible to reduce power consumption in the stand-by mode even more than in the prior art.

SUMMARY

The object of the invention is to further improve the system known from WO 2010/003785 A2 as well as to further reduce the amount of energy required in the stand-by mode.

This object has been achieved in that the electrical device has at least one switch to switch on or off the interference suppression capacitor or to change the overall capacitance of the interference suppression capacitor circuit.

For electrical devices, an interference suppression capacitor is generally provided to suppress or eliminate interfering signals. The interference suppression capacitor is generally disposed directly at the mains connection of the device. The invention is now based on the realization that the interference suppression capacitor is not needed in stand-by mode since in this mode there is only low power consumption and any possible interfering signals are thus also only weak. Consequently according to the invention, when the electrical device is in stand-by mode the interference suppression capacitor is switched off. By switching off the interference suppression capacitor, the power that normally always flows through this capacitor is eliminated. Therefore the overall power in stand-by mode is reduced by this amount. This means that the power consumption as a whole is further reduced.

In principle, switching off the interference suppression capacitor can be effected, for example, by a switch that is connected in series to the interference suppression capacitor and is opened to switch it off.

Instead of one single interference suppression capacitor, the interference suppression capacitor circuit may also have a plurality of interference suppression capacitors.

In a preferred embodiment of an interference suppression capacitor circuit, an additional series interference suppression capacitor having low capacitance is connected in series to the interference suppression capacitor. The switch is connected in parallel to the series capacitor, so that when the switch is closed, the series capacitor is bridged and when the switch is open the interference suppression capacitor and the series capacitor are connected in series.

When the switch is open, the series interference suppression capacitor together with the interference suppression capacitor forms a series connection made up of two capacitances. The overall capacitance of the series connection is then determined as the reciprocal of the sum of the reciprocals of the individual capacitances. The series interference suppression capacitor is preferably at least one to two orders of magnitude smaller than the interference suppression capacitor. Thus the overall capacitance of the series connection approximately corresponds to the capacitance of the series interference suppression capacitor. The reactance of the series connection increases accordingly by the same order of magnitude and only a small amount of current flows. The interference suppression capacitor is thus practically switched off. The advantage is that not only is the current through the interference suppression capacitor decreased but at the same time interference having a very high frequency also continues to be diverted, in other words a residual function is still maintained.

In an alternative embodiment of the interference suppression capacitor circuit, an additional interference suppression capacitor having lower capacitance is, for example, connected in parallel to the interference suppression capacitor and the switch is designed to switch over between the two interference suppression capacitors. Consequently, during operation selection can be made between two different interference suppression capacitors, wherein according to the invention in stand-by mode the smaller interference suppression capacitor is switched over to and in normal operation the larger interference suppression capacitor is switched over to. Where small and large refer to the capacitances and switching over is understood as changing within the meaning of the patent application.

Instead of a two-way switch, the interference suppression capacitor and the additional interference suppression capacitor may each have a switch as well, so that the capacitors can be individually switched on and off. Consequently, by alternately switching the two switches, a switch over between the capacitances can be achieved. In addition, however, the two interference suppression capacitors may be connected in parallel and the interference suppression capacitor increased in this way. The overall capacitance is then determined from the sum of the two individual capacitors.

Such an embodiment may be chosen, for example, when the electrical device has several operating modes that have a different power consumption. The interference suppression capacitor could then be adjusted in steps accordingly.

In all the illustrated variations on the embodiment, the number of interference suppression capacitors and switches is not limited and virtually arbitrary.

To prevent high current peaks during switching due to charge/discharge currents, it is preferable in all embodiments if switching the switch/switches takes place at zero crossing of the mains voltage. It can be additionally expedient to provide a suppressor diode or any other transient protection component.

The decrease in the overall capacitance of the interference suppression capacitor circuit then corresponds to the switching off of the interference suppression capacitor and an increase in the overall capacitance of the interference suppression capacitor circuit corresponds to the switching on of the interference suppression capacitor.

The voltage converter may, for example, be a DC/DC converter that operates according to one of the numerous known functional principles, such as a flyback converter. In particular, the voltage converter has a converter module that assumes the control of the converter.

Alternatively, the voltage converter has a flyback converter and a half-bridge converter both of which are preferably controlled and switched by the same converter module.

In a preferred embodiment of the invention, the voltage converter has a converter module having a start circuit and a switch to switch on the converter module and one to switch on the start circuit respectively. The start circuit may be integrated into the converter module or formed separately.

The electrical device or the power supply unit according to the invention preferably has a power factor correction circuit and a switch to switch on or off the power factor correction circuit PFC (STRT_OFF).

The invention is suitable for almost any electrical device. The invention can be used to particular advantage if the electrical device is a television set having a backlighting system in which the backlighting is supplied with voltage through the half-bridge converter and the television unit through the flyback converter.

The backlighting system of the television has, for example, cold cathode tubes, particularly, however, light emitting diodes.

The control unit preferably has a processor for executing an operating program. By using a microcontroller, the control unit can be simply constructed using only a few components that have low power consumption.

The power supply of the control unit preferably has a capacitive voltage divider that is directly connected to the mains voltage. In this way, no additional inductive converter losses are incurred and the power consumption of the control unit is very low. All in all, the power consumption of the electrical device according to the invention is very low in stand-by mode and, in particular, lower than has been possible in the prior art to date.

BRIEF DESCRIPTION OF THE DRAWINGS

The invention is described in more detail below with reference to the enclosed drawings.

The drawings show.

DETAILED DESCRIPTION OF THE PREFERRED EMBODIMENTS

Figure 1:
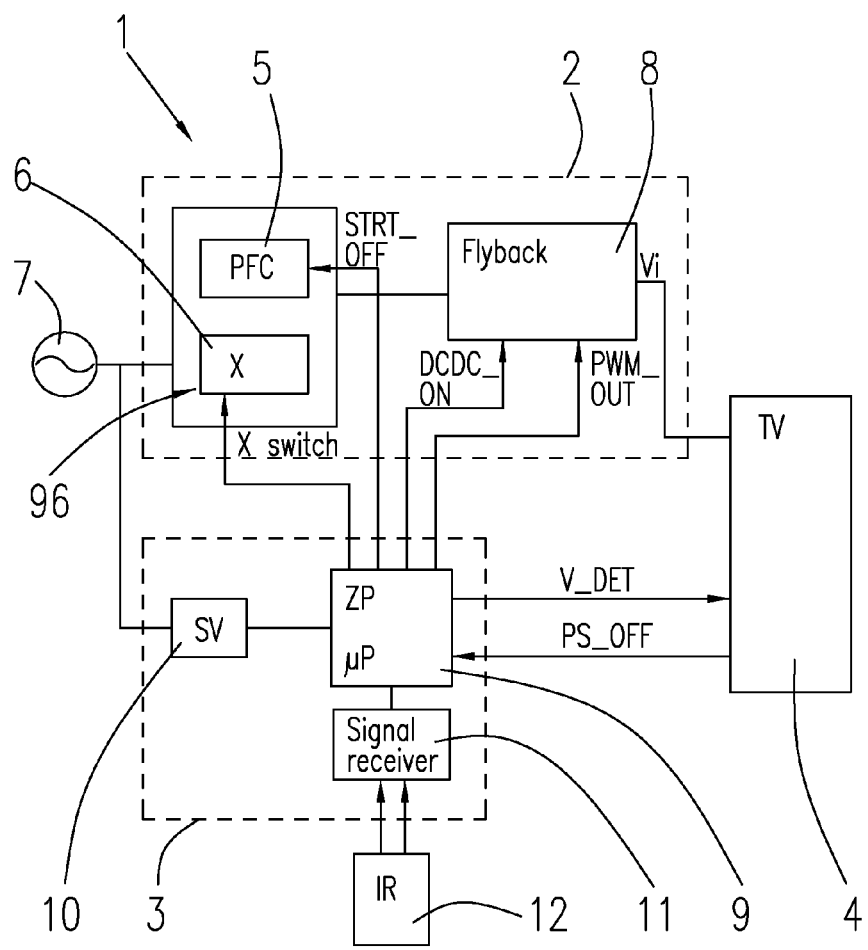
FIG. 1 a schematic construction of a television according to the invention.

FIG. 1 shows a block diagram of a television 1 which is used by way of example to describe the invention in more detail. The television 1 essentially has a power supply unit 2, a control unit 3 and a television system unit 4.

The power supply unit 2 has a power factor correction circuit (PFC) 5 and an interference suppression capacitor circuit 96 having an interference suppression capacitor (X capacitor) 6 that is directly connected to the mains voltage 7. A voltage converter 8 is connected downstream of the PFC 5 which, from the high voltage of the PFC 5, generates a regulated intermediate voltage Vi of 15 V for example. In the example, the voltage converter 8 is a flyback converter having pulse width control (PWM control) that is controlled by a converter module. To start the pulse width control, the voltage converter 8 has a special start circuit, which may, for example, be integrated into the converter module. Other voltage converters could also manage without such a start circuit.

The television system unit 4 is supplied with the regulated intermediate voltage Vi which may be further reduced or processed within the television system unit 4 for various sub-systems.

Moreover, the television 1 has a control unit 3 that is constructed separately from the television system unit 4 and the power supply unit 2. The control unit 3 has a microprocessor or microcontroller 9 that can execute an operating program. Furthermore, the control unit 3 has its own power supply circuit 10 that is directly connected to the mains voltage 7 and a signal receiver 11 to receive the signals of an infrared transmitter 12. The signal receiver may, however, also be designed to receive one or more different wireless or wired signals such as radio signals from Bluetooth® or Zig-Bee.

Figure 9:
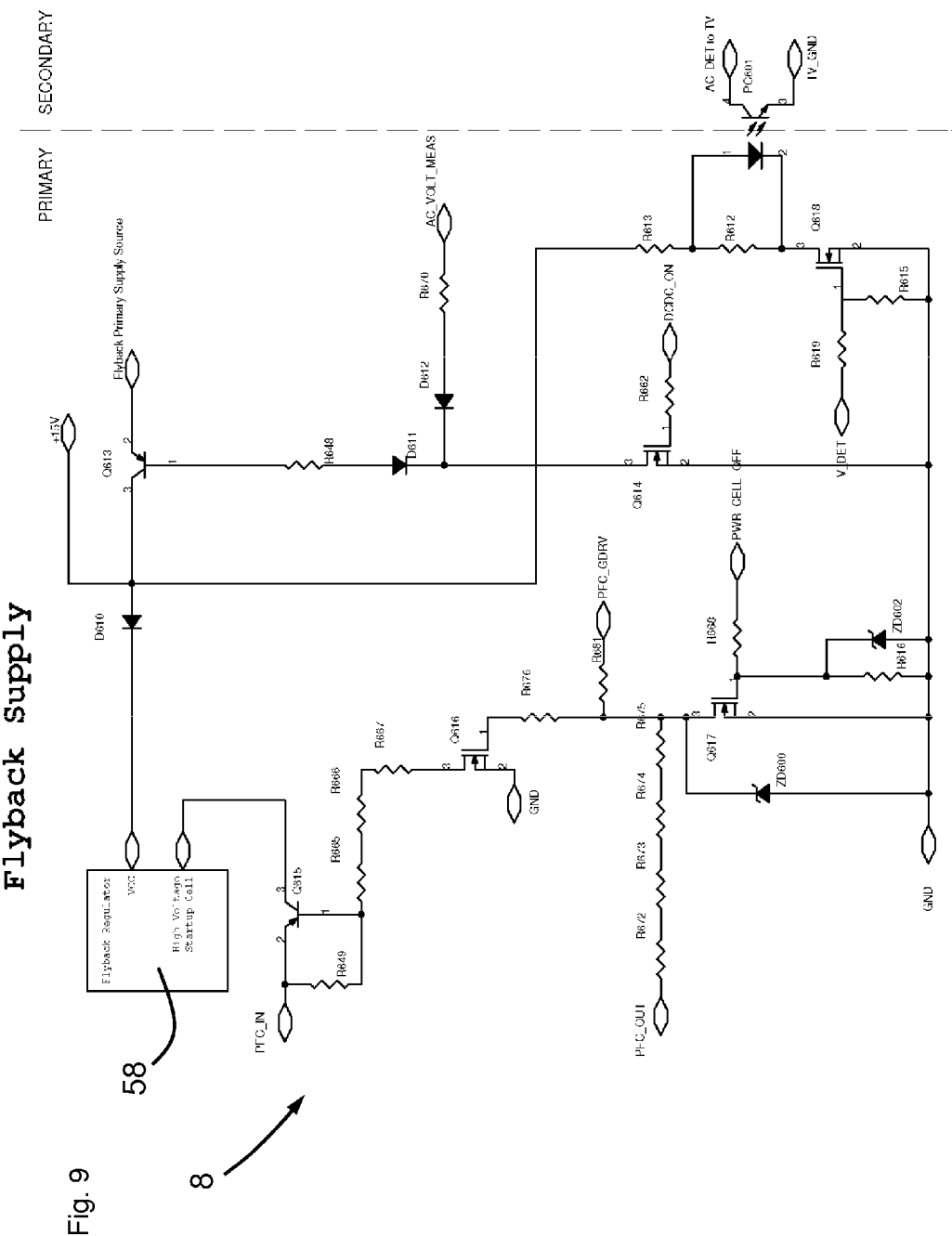

The television 1 has a stand-by mode that is characterized by its low power consumption. The control unit 3 is used to control the stand-by mode (ZPM, zero power mode). For this purpose, the control unit 3 is connected to a plurality of switches. A switch STRT_OFF is disposed in the PFC circuit 5 such that it can disconnect the voltage divider of the PFC from the main grid. An additional switch (X switch) is designed for switching the interference suppression capacitor 6, so that this part can also be switched off (see FIG. 12, FIG. 22 and FIG. 23). An additional switch DCDC_ON is disposed in the voltage converter 8, so that the operating voltage of the converter module 58 of the PWM control can be switched and an additional switch PWM_OUT makes it possible to switch the start circuit of the converter module 58 of the voltage converter 8 on or off (FIG. 9). Since this circuit also consumes power without the operating voltage of the PWM control, switching off the start circuit additionally reduces the power consumption of the overall system. If there is no start circuit, it is clear that such a switch is not necessary. The individual switches are partly illustrated in the example and partly indicated by their respective control signals. The respective arrows indicate the direction of the signal. The switches are accordingly switched by the control unit 3. However, the invention is not limited to the given number of switches.

As long as the electrical device (television) is in stand-by mode (ZPM=zero power mode), only the processor 9 of the control unit 3 is initially supplied with power, so that power consumption is minimal. The switches are switched by the control unit such that all important parts of the power supply unit 2 are without power and do not consume any electricity.

The power supply 10 of the control unit 3 preferably has a capacitive voltage divider that is designed such that just enough power for the processor 9 and the signal receiver 11 is provided. Since no converter losses occur in the capacitive voltage divider, power consumption in stand-by mode is very low. The mains voltage (AC_VOLT_MEAS) is preferably measured at this power supply 10.

The signal receiver 11 is only periodically switched on and interrogated in this operating mode, so that on average it requires very little energy. In the example, the signal receiver 11 is switched on every 90 ms for approximately 0.2 ms. This makes it possible to significantly reduce power consumption and yet maintain an almost delay-free reaction to a signal.

Figure 2:
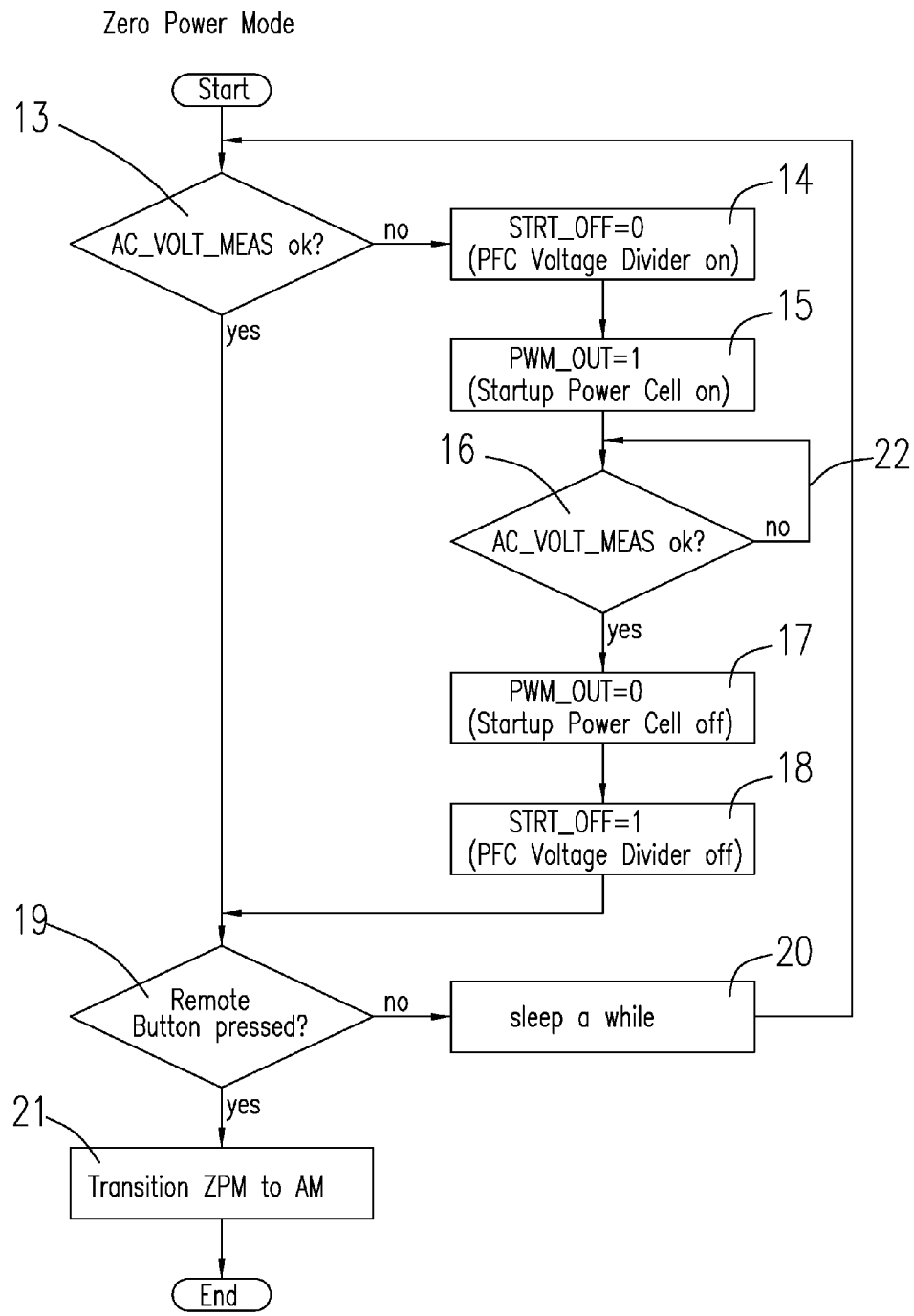
FIG. 2 a program flow chart of the control circuit in stand-by mode (ZPM) according to the invention, FIG. 3 a program flow chart of the control circuit on transition from ZPM to active mode (AM), FIG. 4 a program flow chart of the control circuit in AM, FIG. 5 a program flow chart of the control circuit on transition from AM to ZPM, FIG. 6 a program flow chart of the control circuit on connecting the device to the power supply, FIG. 7 a block diagram of another television according to the invention, FIG. 8 a circuit diagram of the power supply of the control unit, FIG. 9 a circuit diagram of the flyback converter, FIG. 10 a circuit diagram of the power factor correction voltage converter, FIG. 11 a circuit diagram of the microprocessor of the control unit, FIG. 12 a schematic circuit diagram of an interference suppression capacitor circuit, FIG. 13 a program flow chart of the control circuit on connecting the device to the power supply, FIG. 14 a program flow chart of the control circuit on transition from AM to ZPM, FIG. 15 a program flow chart of the control circuit on transition from ZPM to active mode (AM), FIG. 16 a program flow chart of the control circuit in stand-by mode (ZPM) according to the invention, FIG. 17 a program flow chart of the control circuit in active mode for determining a flank, FIG. 18 a program flow chart of the control circuit in active mode for determining the voltage, FIG. 19 a program flow chart of the control circuit in active mode for interrogating the signal receiver, FIG. 20 a program flow chart of the control circuit in active mode that is related to the voltage measurement, FIG. 21 an alternative embodiment of the television of FIG. 7, FIG. 22 an alternative interference suppression capacitor circuit, and FIG. 23 an additional alternative interference suppression capacitor circuit.

FIG. 2 schematically shows the program run for the processor 9 of the control unit 3 in zero power mode (ZPM). In each passage through the loop a test is initially made to see if mains voltage 7 (AC_VOLT_MEAS) 13 is available. If there is no voltage 7 (no), then there is either a brief mains failure or the television 1 has been unplugged or disconnected from the mains voltage 7. If the device has been unplugged, it is important that within a very short time (a few seconds) no voltage occurs at the plug contacts so as to prevent an electric shock. Hence, the interference suppression capacitor 6 has to be discharged. For this purpose, the voltage divider of the PFC 5 STRT_OFF=0 (PFC Voltage Divider on) 14 and the start circuit of the voltage converter PWM_OUT=1 (Startup Power Cell on) 15 are switched on since they have a high power requirement and quickly discharge any residual charge remaining in the interference suppression capacitor 6. The mains voltage (AC_VOLT_MEAS) 16 is subsequently tested again. If there is still no mains voltage 7, this measurement continues to be repeated 22 until a voltage is available or the device turns off due to lack of power. If the measurement result is again positive (yes), the start circuit (PWM_OUT=0) 17 and the PFC circuit 5 (STRT_OFF=1) 18 are switched off again and the program is continued in zero power mode.

If a voltage 7 is available, the signal receiver 11 is activated and tests whether there is a signal to end the zero power mode (Remote Button pressed) 19. If no signal has been received, there is a short wait (sleep a while) 20 and the program is started from the beginning.

Figure 3:
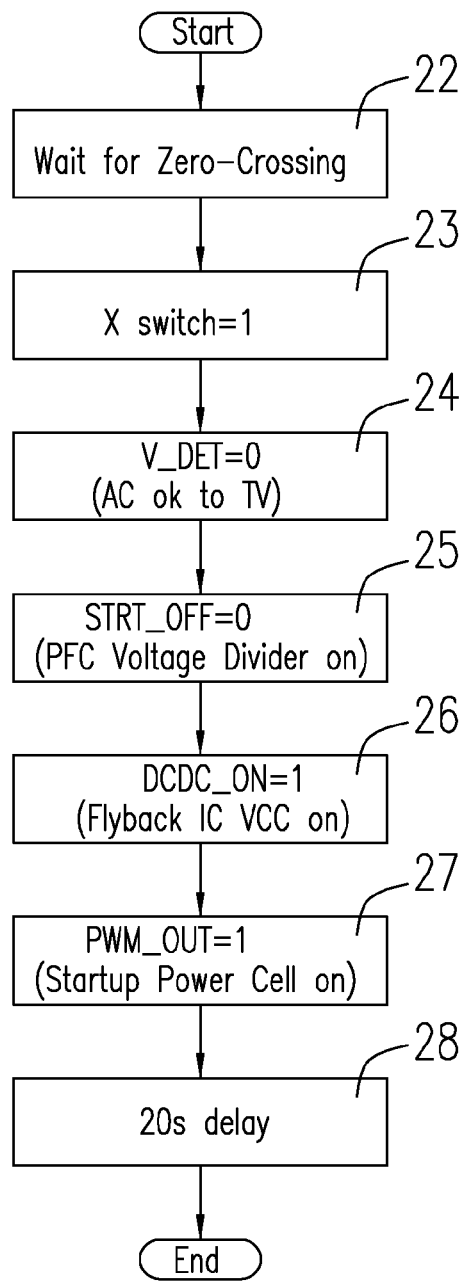

If a signal to end the zero power mode is received, the program 21 for the transition from the zero power mode to the active mode (AM) according to FIG. 3 is started. To begin with, a zero crossing of the mains voltage is awaited 22 in order to then switch on the X capacitor 6 using switch X-Switch=1 23. Because switching is made in zero crossing, there are no current peaks which would otherwise occur when high voltage is quickly applied to the capacitor.

Then the television is signaled via a signal on V_DET=0 that a voltage is available 24 (AC ok to TV) and the PFC circuit is switched on via the switch STRT_OFF=0 25. If the electrical device does not have a PFC, this step can be omitted.

The power supply of the flyback converter IC is then switched on via the switch DCDC_ON=1 26 and the start circuit of the flyback converter is activated via switch PWM_OUT=1 27. As an option, there can be a further short wait 28. However, this is generally not necessary. With these steps, the television is ready for operation (AM) and the zero power mode (ZPM) is ended.

Figure 4:
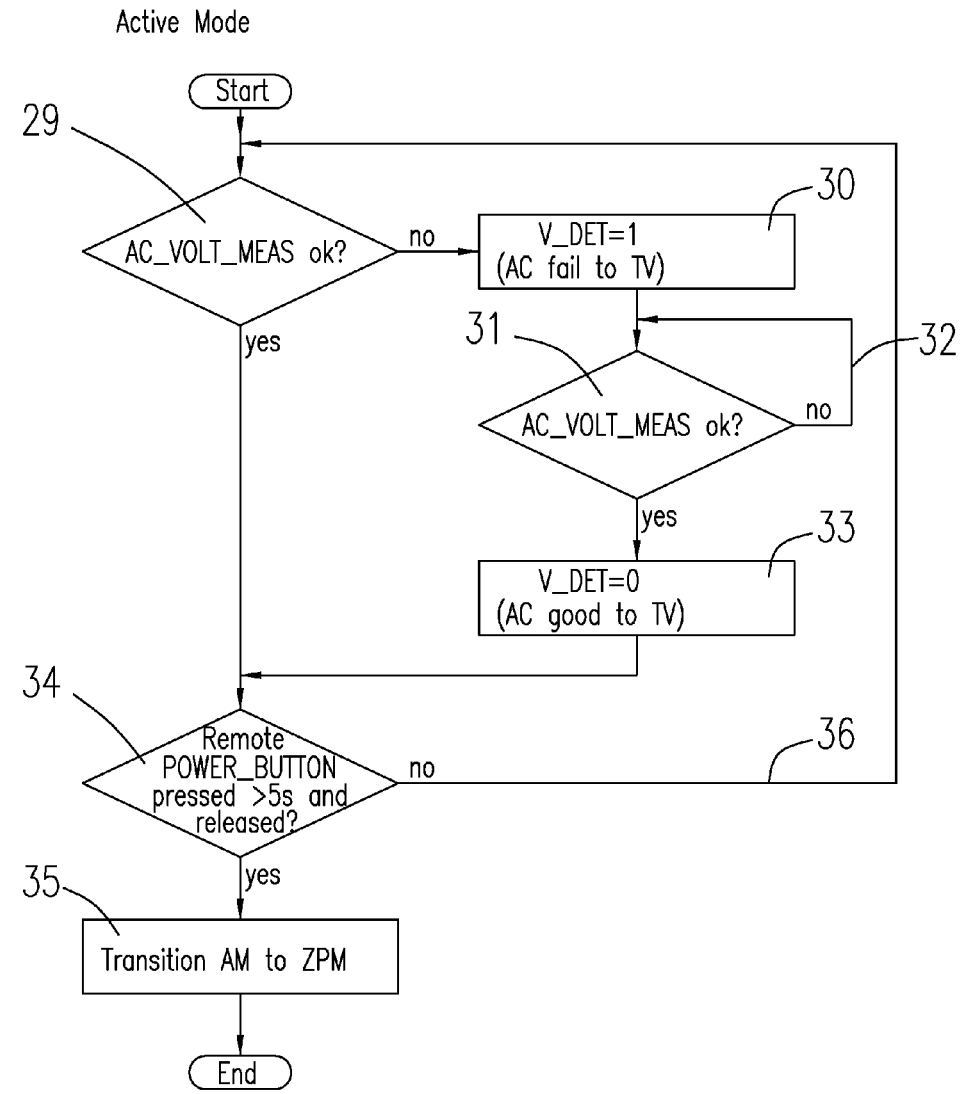

In the active mode (AM) of the television, the control circuit remains active and carries out the program according to FIG. 4. Here, the signal receiver 11 can be continuously active.

A test is again initially made in a loop to see if the mains voltage 7 is available 29. If not, the television is initially signaled the absence of the mains voltage via the error signal V_DET=1 30. What the television does with this information is not the subject-matter of the invention. If required, a test is then made again 32 to see if mains voltage is available 31. If not, the program run interrupts itself due to the inadequate supply of power. If yes, the error signal V_DET=0 is sent to the television 33 and the test loop 32 is ended.

If a voltage 7 is available, the signal receiver 11 is tested to see whether a signal to begin the stand-by mode has been received 34 (Remote POWER_BUTTON pressed). If not, the loop is repeated 36. Here, a waiting time is not necessary since compared to an operating television, the control circuit needs only a tiny amount of extra power.

Figure 5:
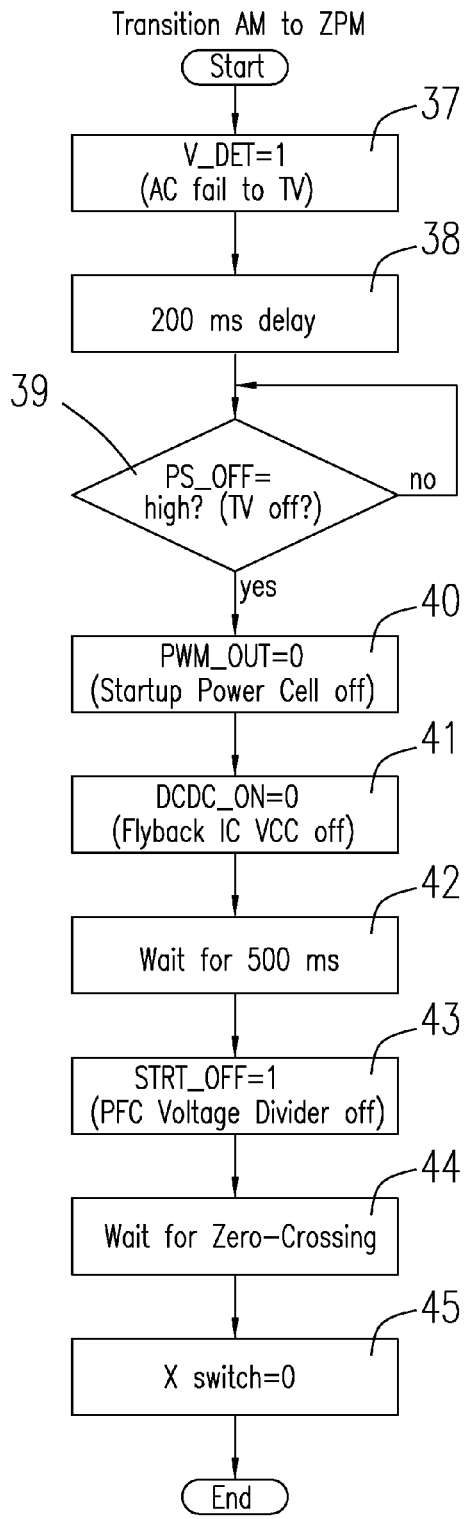

If a stand-by signal has been received, the program for transition from the active mode (AM) to the stand-by mode (ZPM) according to FIG. 5 is run 35. Initially the television system unit 4 is signaled via the error signal line V_DET=1 that voltage is no longer available 37. The signal is then used as a switch-off signal. The television system unit 4 thereupon runs its internal switch-off program and reports its end with a signal PS_OFF, which following a short delay 38 is awaited 39.

As soon as the television has ended its program, the power supply can be safely disconnected. To do this, the start circuit of the flyback converter 8 is initially stopped using the switch PWM_OUT=0 40 and the power supply of the flyback converter 8 is disconnected using the switch DCDC_ON=0 41. After a short wait 42, the PFC circuit using the switch STRT_OFF=1 is disconnected from the mains on the primary side 43. In a zero crossing of the mains voltage 44, using the switch (X-Switch=0), the interference suppression capacitor 6 is finally switched off 45. Thus the television is again in stand-by mode (ZPM) and runs the program according to FIG. 2. Power consumption in this mode is about 5 mW.

Figure 6:
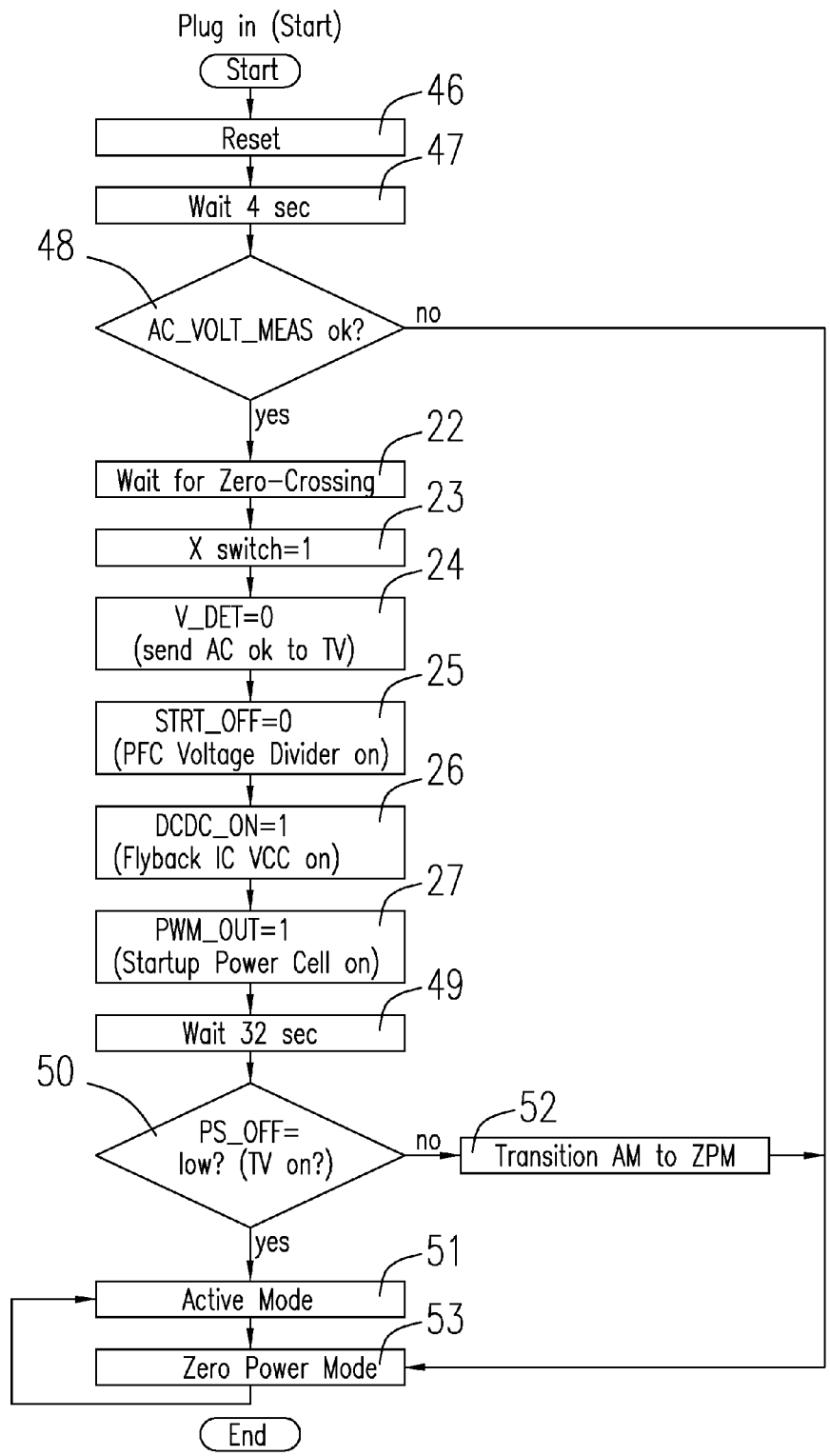

After the television has been plugged in or after a short voltage loss in one of the described operating programs, the program according to FIG. 6 is started. First, all systems are reset 46 and after a short wait 47 a test is made to see whether enough voltage is available for normal operation 48. If not, the system enters the stand-by mode 53 program according to FIG. 2.

If sufficient voltage is available, the program steps are run as for the transition from zero power mode (ZPM) to the active mode (AM) according to FIG. 3, i.e. the systems are switched on in the known sequence 22 to 27. After a short wait 49, a saved signal PS_OFF is evaluated 50 that reports whether the television was switched on or off before the voltage loss. If it was switched on, all the parts of the circuit are switched on and the processor moves into the program for the active mode (AM) according to FIG. 4 51.

If the television was switched off, the program for transition to the stand-by mode (ZPM) according to FIG. 5 is run 52.

Depending on the application it could be useful, however, if the previous status of the device is ignored and the active mode or the stand-by mode is always entered. This could also be made configurable by the user.

Figure 7:
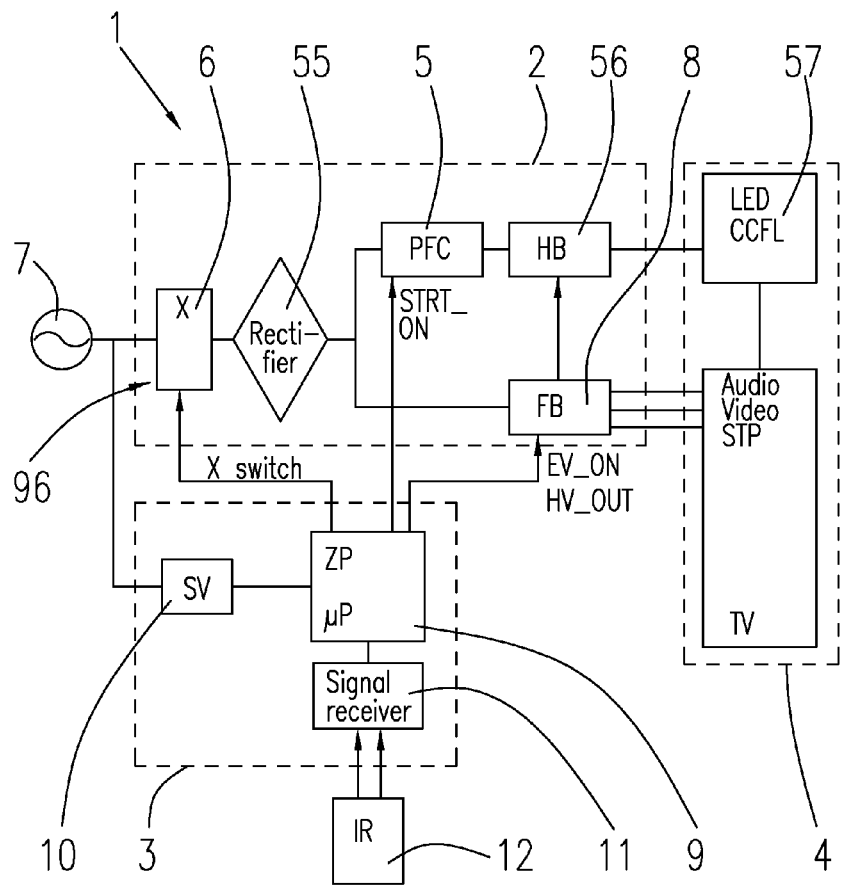

FIG. 7 shows a block diagram of an electrical device having a lighting system, using by way of example a television having a LED backlight. The television has a power supply 2 according to the invention that is connected to the mains voltage 7. An interference suppression capacitor (X capacitor) 6 is first disposed at the mains voltage 7. A rectifier 55 is connected downstream of the X capacitor 6 from which a power factor correction (PFC) voltage divider 5 is controlled. A half-bridge voltage converter 56 is connected downstream of the PFC 5 by means of which the backlight 57 of the television is supplied with voltage. The backlight 57 may also have, for example, cold cathode lamps.

The LED backlight 57 has at least one LED string or one LED matrix 54 that is made up of a connection in series and/or in parallel of a plurality of light emitting diodes. The advantage of having a light emitting diode backlight is that a high-voltage supply is not needed. The power supply unit 2 is thus very simple in design. The light emitting diodes of the lighting system are current controlled and are controlled separately from the television system unit. The backlight for a television as described is only one possible application for a lighting system according to the invention. The light emitting diodes could also be disposed in a ceiling or table lamp for general lighting purposes.

A flyback converter (FB) 8 is furthermore connected to the rectifier 55 by means of which the television 4 and individual functional units of the television 4, such as audio and video units, are supplied with different DC voltages.

Beside this, the power supply 2 has a control unit 3 according to the invention for monitoring the operating modes of the television 4, as described previously with reference to FIG. 1.

Figure 8:
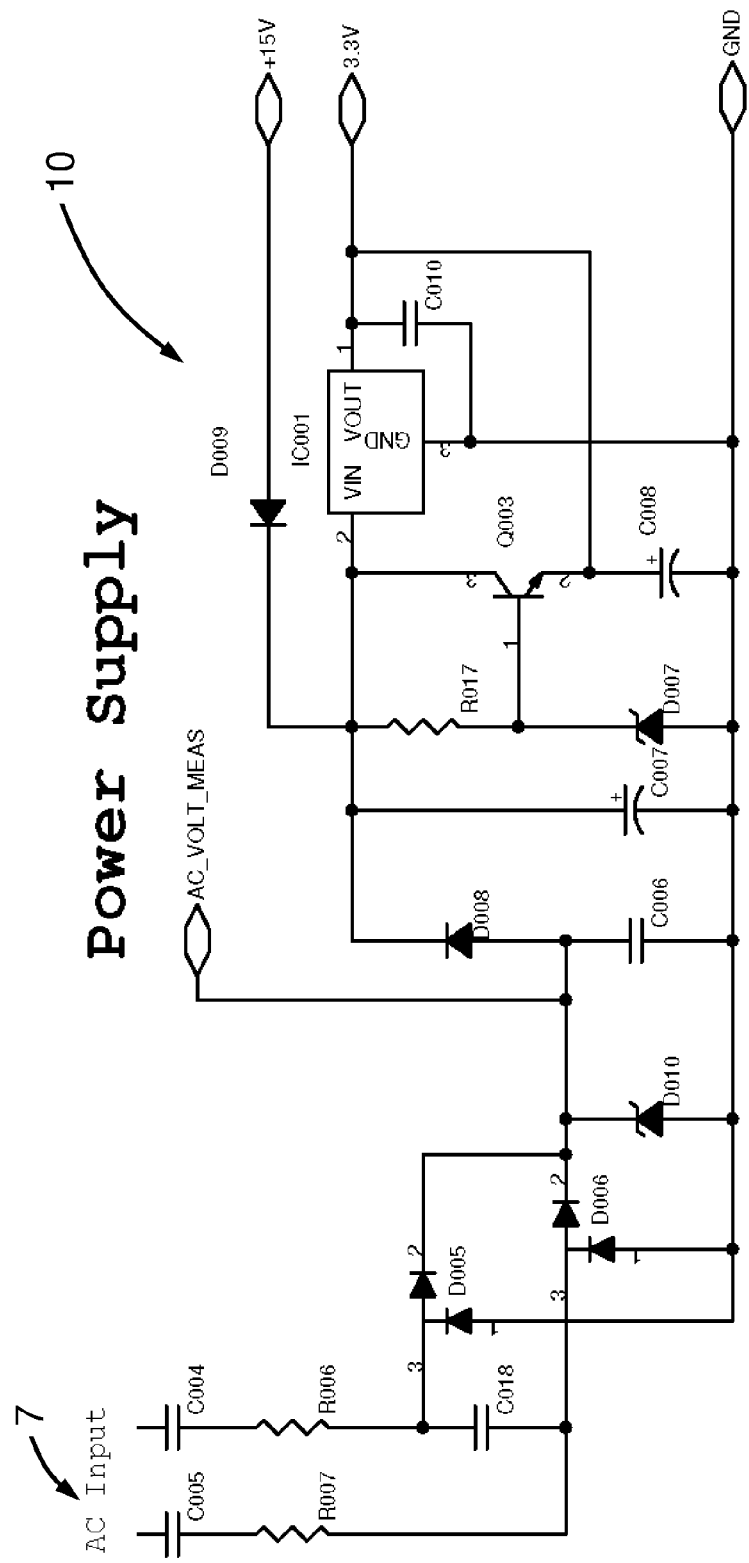

FIG. 8 shows a circuit diagram of an embodiment of the power supply of the zero power control unit 3. This power supply 10 is realized using a capacitive coupling via the capacitors C005 and C004 directly from the mains voltage 7. DC voltage is generated via a diode network D005 and D006. The Zener diode D010 acts as an overvoltage protector, where the capacitor C018 reduces the current through this Zener diode D010. The electrolytic capacitor C007 and the diode D008 go to smooth the DC voltage. To regulate the voltage, a conventional linear regulator taking the form of an integrated circuit IC001 is provided. Using only a few external components, this circuit generates a 3.3 V operating voltage for the zero power microprocessor 9.

In zero power operation, the power is supplied via the mains voltage, where, thanks to the purely capacitive coupling, practically no power dissipation occurs.

If the television is running in normal operation, i.e. the flyback converter 8 has been started, the processor 9 is supplied via a 15 V DC voltage from the primary power supply that is fed via the diode D009 into the circuit. In this case, the extra power consumption is of no importance.

The circuit 10 continues to provide the important signal AC_VOLT_MEAS for the operation of the power supply 2. This signal is used in the operating program sequence to determine whether a mains voltage is available (see program steps 13, 16; 29, 31; 48).

In FIG. 9, a circuit diagram of the flyback converter 8 is shown. The flyback converter 8 has a control module 58 that is designed as an integrated circuit. The control module 58 has a start circuit that tries to start the flyback converter 8 when a control signal HV_OUT (PWR_CELL_OFF) is received. This can only be achieved if the control module 58 is supplied with an operating voltage VCC. In the circuit diagram, this takes place via the control signal DCDC_ON. When there is a signal at this input, the transistor switch Q614 is conductive, so that the transistor Q613 is also conductive, which connects the operating voltage VCC of the control module 58.

Figure 10:
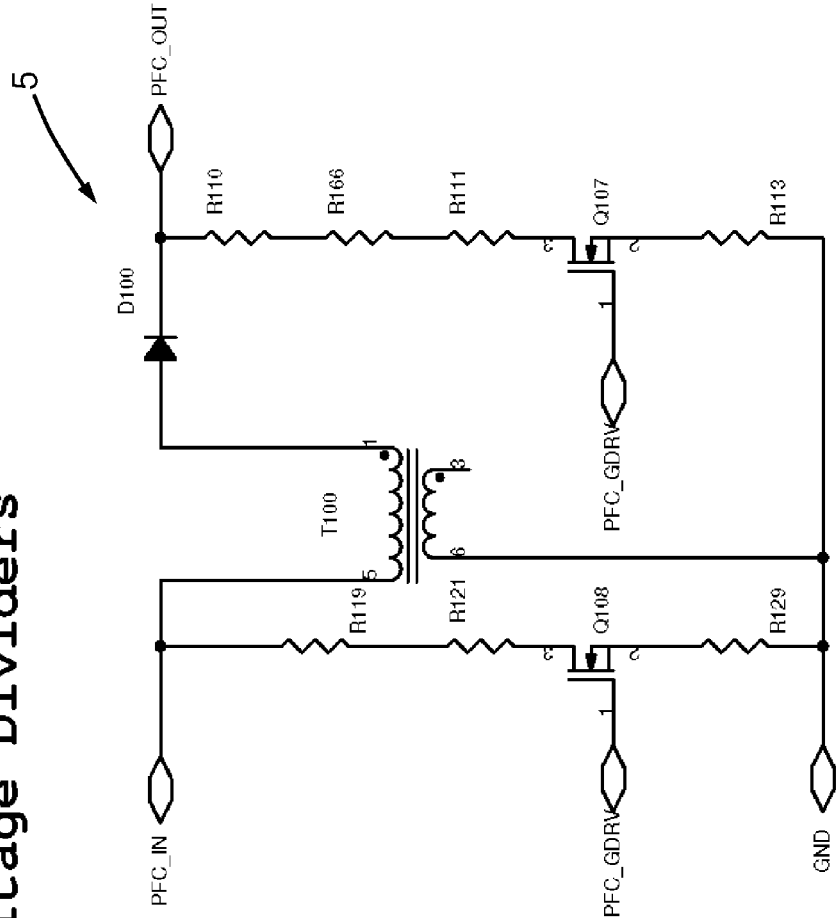

FIG. 10 shows an exemplary embodiment of the PFC voltage divider 5 having two FET switches Q108 and Q107 and a transformer T100.

Figure 11:
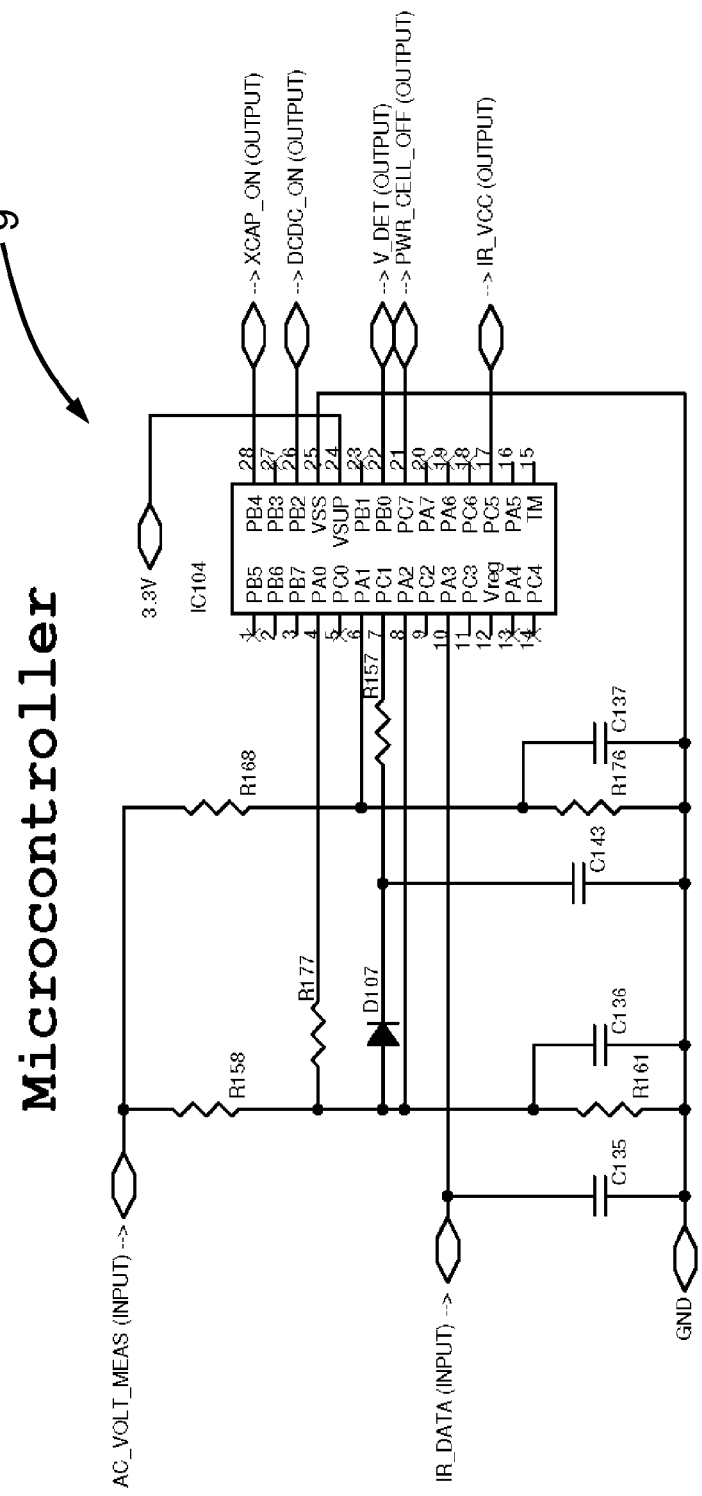

In FIG. 11, the microprocessor 9 of the zero power circuit 3 is shown. The microprocessor is the central control point of the power supply 2. It has the inputs and outputs for all the important control signals that are needed for running the operating program. The processor obtains the 3.3 V operating voltage from the separate power supply 10 (FIG. 8). The input signals are arranged on the left-hand side of the circuit diagram, whereas the output signals are arranged on the right-hand side.

At input IR_DATA, the processor receives the control commands received by the signal receiver 11. IR_VCC provides the power supply for this. XCAP_ON switches the interference suppression capacitors 6 (see FIG. 12). DCDC_ON switches the power supply for the flyback converter control module 58 and PWR_CELL_OFF switches the start cell of the control module 58. V_DET signals the television whether mains voltage is available, whereas AC_VOLT_MEAS is the measurement signal of the mains voltage.

Figure 12:
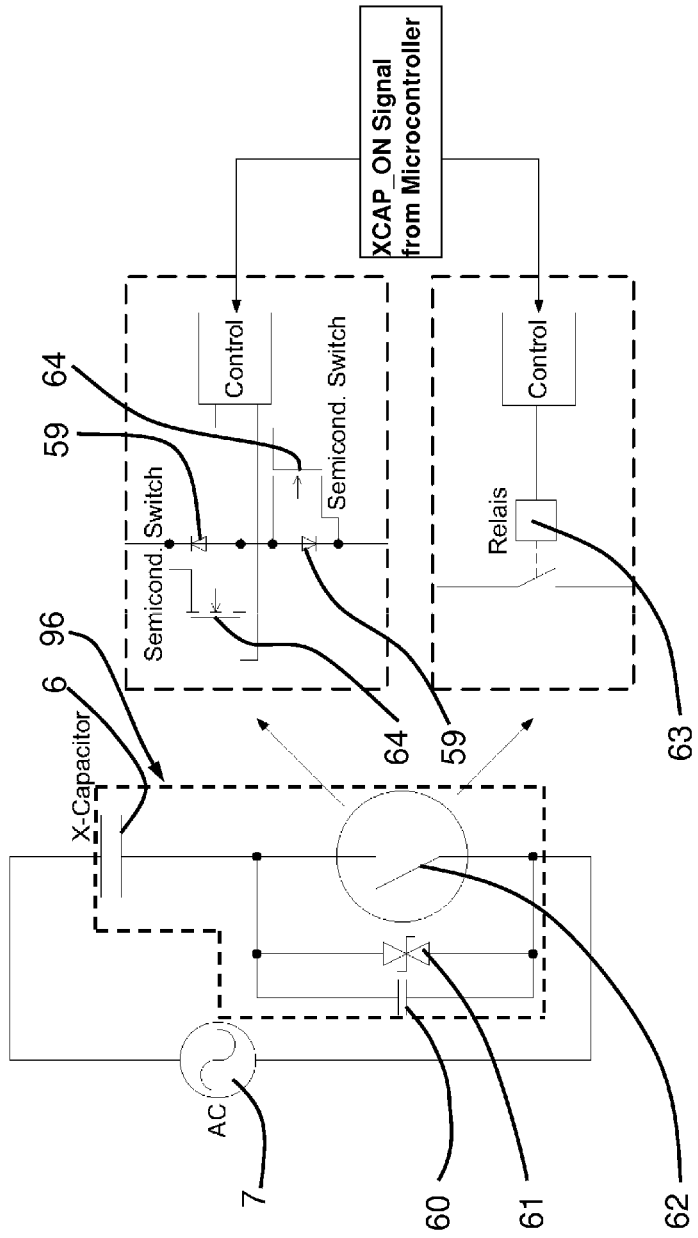

Instead of one single interference suppression capacitor 6, the interference suppression capacitor circuit 96 may also have a plurality of interference suppression capacitors. Such an interference suppression capacitor circuit 96 is shown in FIG. 12 by way of example. In the illustrated interference suppression capacitor circuit 96, an additional series interference suppression capacitor 60 that has approximately 0.1 to 0.01 times the capacitance of the interference suppression capacitor 6 is connected in series to the interference suppression capacitor 6. Parallel to the series interference suppression capacitor 60 are connected a suppressor diode 61 and a switch 62, where the suppressor diode 61 suppresses transients that may arise through switching processes.

If the switch 62 is closed, which is the case for signal XCAP_ON=1, current flows through the interference suppression capacitor 6 and the switch, so that the series capacitor 60 is bridged. The interference suppression capacitor 6 has high capacitance and functions normally in this position. This status is chosen for a television 4 that is switched-on in active mode, since greater interference occurs here which has to be eliminated through the interference suppression capacitor 6. In the stand-by mode, the power consumption is very low, so that the interference is also low. In this case, the switch 62 is opened. The series interference suppression capacitor 60 is thereby connected in series to the interference suppression capacitor 6. Through the series connection of the two capacitors, the overall capacitance is now determined by the reciprocal of the sum of the reciprocals of the individual capacitances, so that altogether it is low. The overall capacitance of the interference suppression capacitor circuit 96 is thereby lower by a corresponding order of magnitude, as a result of which the current through the capacitors is also decreased by the corresponding order of magnitude. The power consumption in stand-by mode of the device according to the invention is thereby further significantly decreased compared to the prior art.

Here, the switch can be a mechanical switch, such as a relay 63 or a semiconductor switch 64 (such as an IGBT or FET).

In the illustrated example, two field-effect transistors 64 are connected in series, where a diode 59 is connected in parallel between the drain and source terminal respectively. The two diodes are polarized in opposition to one another so as to prevent a flow of current when the switch is open. The gate terminals are connected via a control module to the XCAP-ON control signal of the control unit 3.

Figure 22:
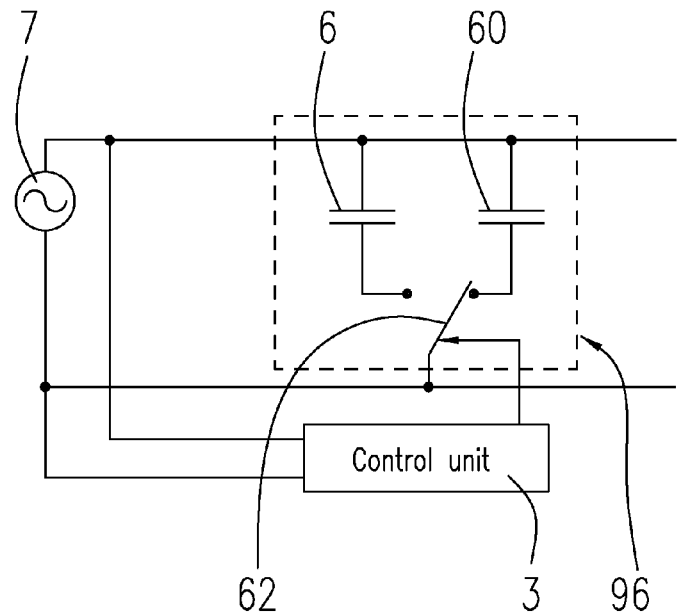
Figure 23:
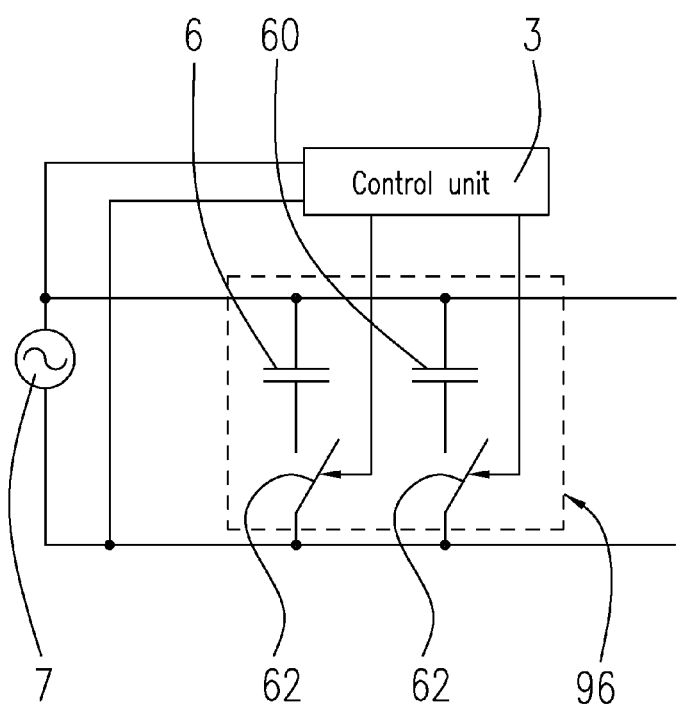

In FIGS. 22 and 23, alternative interference suppression capacitor circuits 96 are shown. In the circuit according to FIG. 22, an additional interference suppression capacitor 60 having lower capacitance is connected in parallel to the interference suppression capacitor 6. The switch 62 is disposed such that it is possible to switch over between the two interference suppression capacitors. Thus, in the active mode, the larger interference suppression capacitor 6 can be switched over to, so as to utilize the full filter effect. In the zero power mode, the smaller interference suppression capacitor 60 is then switched over to, which goes to significantly reduce the current through the interference suppression capacitor as a whole. The overall capacitance is then determined by the individual capacitance of the interference suppression capacitor that is currently switched on.

Instead of the two-way switch, the circuit according to FIG. 23 has a separate switch 62 for each interference suppression capacitor, so that by alternately switching the two switches 62, switch over can also be made between them. However, in this arrangement both interference suppression capacitors 6, 60 could be connected in parallel, so that overall capacitance is increased to the sum of the two individual capacitances. This allows, for example, a respectively adapted suppression capacitance to be chosen for a device that has several operating modes.

In these embodiments, the switches are also switched by the control unit 3. What is important is that the switch or switches 62 is/are preferably switched at zero crossing of the mains voltage.

To discharge the interference suppression capacitor, it is not necessary to operate the switch 62. In particular cases, however, it could be advantageous if, during a mains interruption, the additional switch 62 is also operated as soon as the originally active interference suppression capacitor has been discharged.

In all variants, it is advantageous if the capacitances of the interference suppression capacitors differ by at least one order of magnitude. In particular the difference in capacitances lies between one and three orders of magnitude, where it is clear that other ratios are possible.

An electrical device having this kind of interference suppression capacitor circuit 96, can be operated using the same operating program without any changes. The decrease in the overall capacitance of the interference suppression capacitor circuit 96 then corresponds to switching off 45 (X-Switch=0) the interference suppression capacitor according to the program sequence and an increase in the overall capacitance of the interference suppression capacitor circuit 96 corresponds to switching on 23 (X-Switch=1) the interference suppression capacitor according to the program sequence.

FIGS. 13 to 20 show alternative sequential programs for the microprocessor 9.

Figure 13:
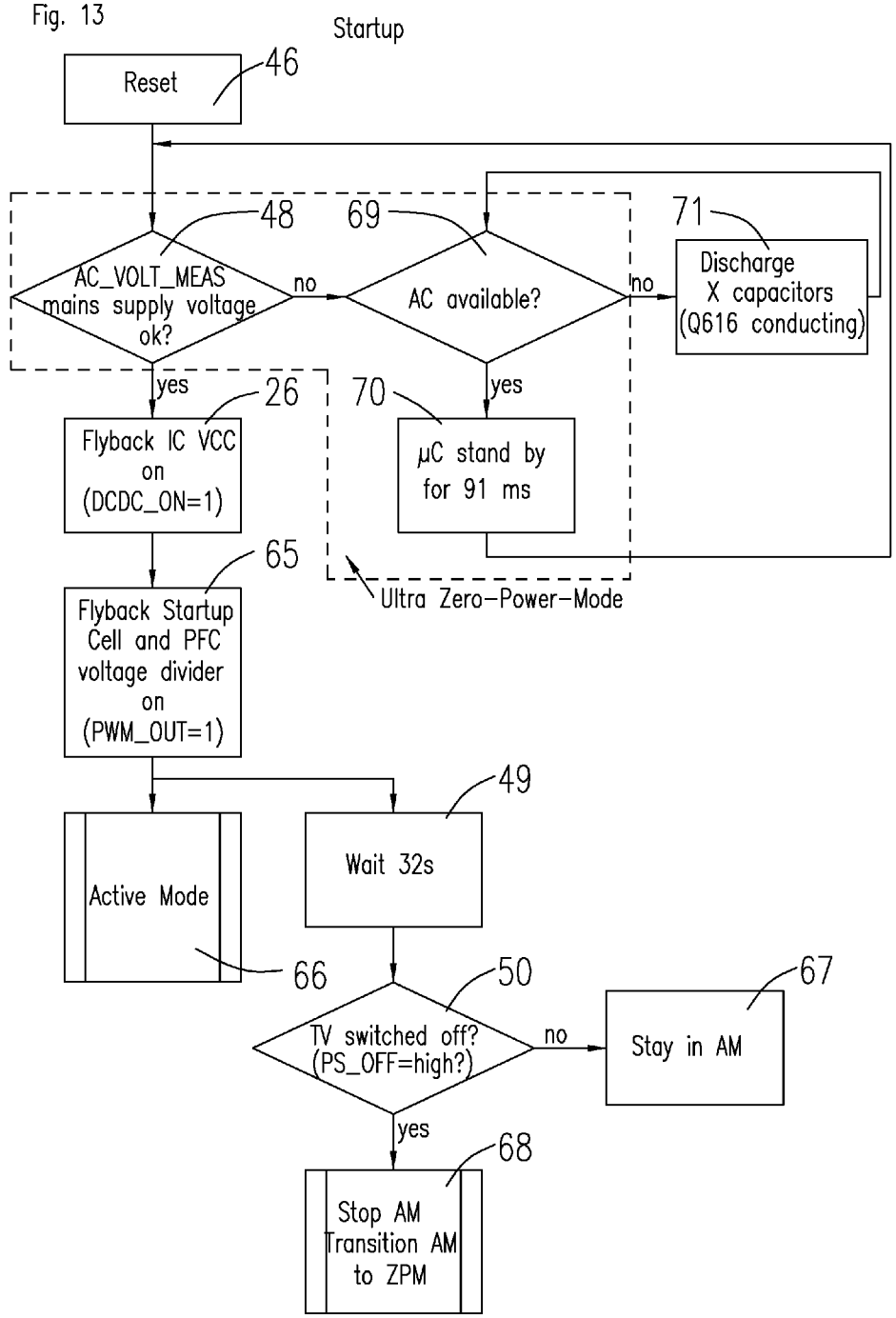

FIG. 13 shows a start program modified with respect to FIG. 6 as it would be run, for example, after the mains plug has been plugged in. Initially the circuit is reset 46. Then it is determined whether the mains supply voltage 7 is sufficient 48. This is carried out, for example, through the operating program according to FIGS. 17 to 20.

If yes, the power supply VCC of the flyback converter control module 58 is switched on 26 through the signal DCDC_ON=1. Then the flyback converter 8 is started (PWR_CELL_ON) and the PFC voltage divider 5 is switched on 65. This occurs via a signal PWM_OUT=1. The power supply is then active and the operating program for the active mode 66 is started.

In the active mode, there is first a wait of 32 s 49, in order to then test 50 whether the television has been turned off in the meantime (PS_OFF=high). If no, the television remains in the active mode 67. If yes, the active mode is ended and transition is made to the stand-by mode 68.

If it is determined in step 48 that not enough mains voltage is available, a test is initially made to find out whether there is any connection at all to the mains 69. If yes, the processor is put to sleep for 91 ms 70 and then the program is continued with step 48. If no, the interference suppression capacitor 6 is discharged (Q616 conductive) 71 and step 69 repeated. It is necessary to discharge the interference suppression capacitor 6 since in the electrical device according to the invention there is no discharging resistor connected in parallel to the interference suppression capacitor 6. Although this reduces the power consumption, it prevents the interference suppression capacitor 6 from being discharged quickly enough when the mains plug is pulled out. For the sake of safety, it is important that the plug contacts are very quickly free of any charge, to prevent anyone from receiving an electric shock.

Figure 14:
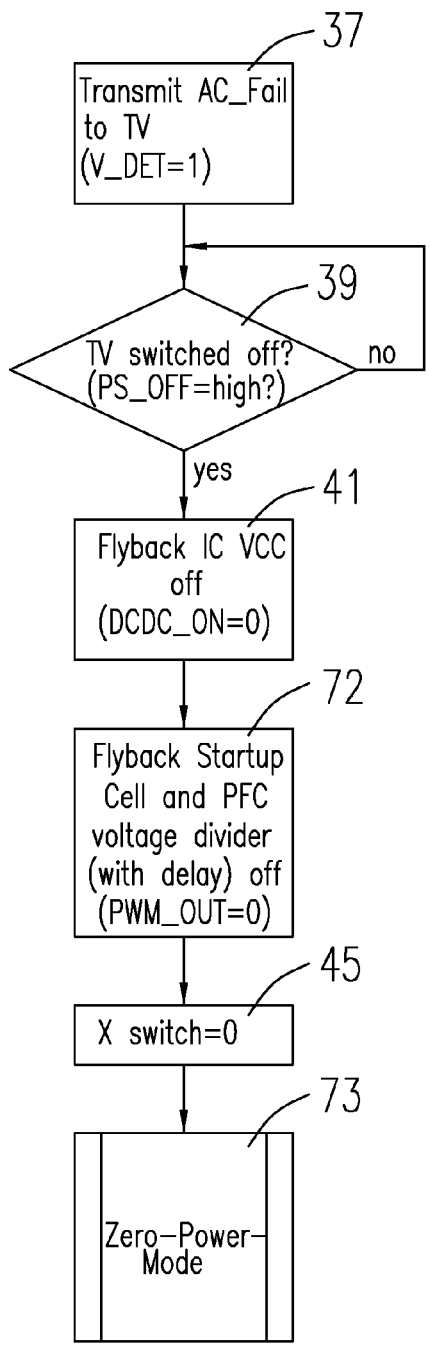

The transition from active mode (AM) to stand-by mode (ZPM) is shown in FIG. 14. Initially the television 4 is signaled via V_DET=1 that there will soon be no operating voltage available 37. Then there is a short wait until the television reports its switch-off through PS_OFF=high 39. As soon as this occurs, the supply voltage VCC of the flyback converter control module 58 is switched off 41. Then the start cell of the control module and the PFC voltage divider 5 is switched off 72 and finally the interference suppression capacitor 6 is switched off 45. The power supply is then in zero power or stand-by mode 73.

Figure 15:
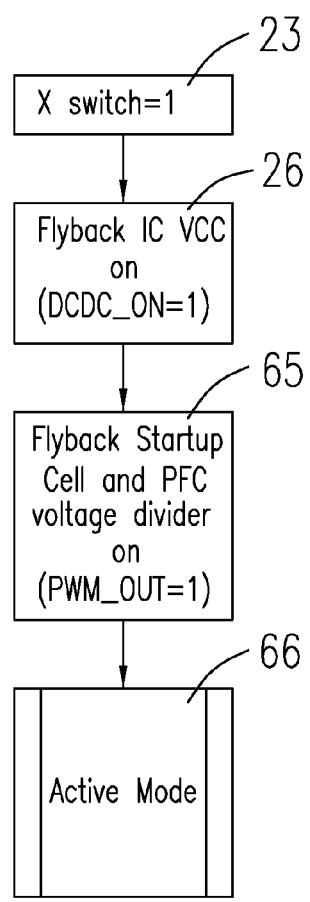
Figure 18:
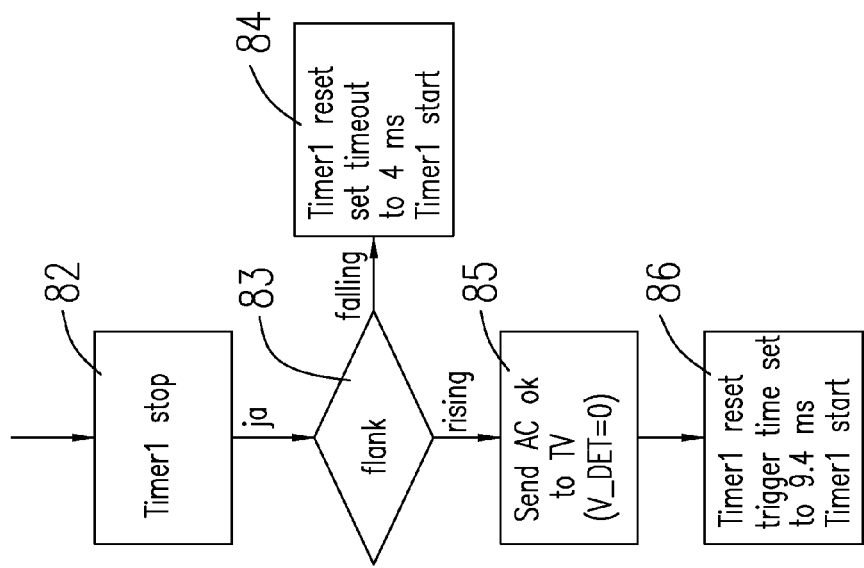

The transition from zero power mode (ZPM) to the active mode (AM) takes place according to FIG. 15. Here, the interference suppression capacitor 6 is initially switched on 23 and then the flyback converter module 58 is supplied with voltage 26 and then the start cell of the module 58 is started and the PFC switched on 65.

Here again, instead of the interference suppression capacitor 6, an interference suppression capacitor circuit 96 having at least one interference suppression capacitor 6, 60 can be used.

In zero power mode, the program according to FIG. 16 is executed. The execution of the program is controlled by an interrupt timer Timer2, so that the program is only started every 91 ms. In between times, the circuit is in an ultra zero power mode, since here no current is needed for the processor. This means that the overall power consumption is thus once again significantly reduced. The relatively short off-time of 91 ms ensures that any signals of the remote control can be reacted to rapidly enough. A longer off-time would certainly save more electricity, but could appear annoyingly slow for the user.

At the end of the interrupt time of 91 ms a test is made to see whether sufficient mains voltage is available 48. If no, it is tested whether there is a mains connection at all 69. If yes, the microprocessor is put to sleep 70 and nothing further happens until the program is started again through the sequence of Timer2. If there is no mains voltage available, the interference suppression capacitor 6 is discharged for the sake of safety 71 and the test 69 is repeated.

If mains voltage is available, the signal receiver 11 is initially switched on 74 and there is a short wait until it is ready to receive 75. Then a test is made to see whether a signal of the transmitter 12 is received 76. If not, the receiver is switched off 77 and the processor is put to sleep 70.

If there is a signal, it is decoded 78 and tested whether the signal serves to switch on the television 4 79. If not, the process continues as above with step 77. If yes, the operating program 80 for the transition from zero power mode to the active mode according to FIG. 15 is executed.

The television has, for example, four different operating modes each of which differ in their power consumption. In the active mode, all systems are available. In a reduced mode the lighting system of the television, i.e. the backlight, is deactivated. The zero power mode is augmented by a conventional stand-by mode from which the television can be put more speedily into operation and which can thus be used for short breaks in operation. With the interference suppression capacitor circuit described in FIG. 23, for each of these different operating modes suitable interference suppression capacitors can be connected.

Figure 19:
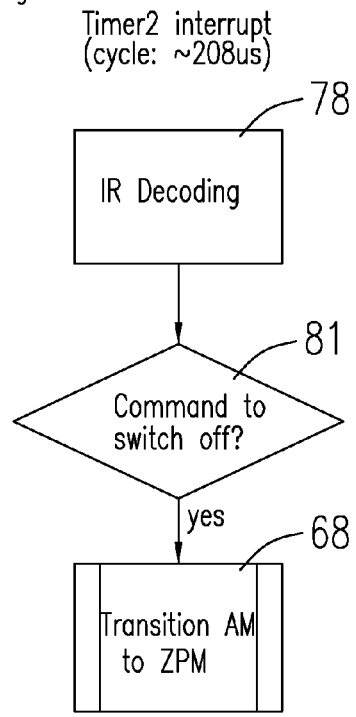

In the active mode, the extra power consumption by the microprocessor 9 is negligible, which is why the Timer2 Interrupt is shortened to 208 us as shown in FIG. 19. After this period, any signal received at the signal receiver 11 is decoded 78 and if the command is to switch off the television 81, it is switched off by the operating program for transition from the active mode to stand-by mode 68.

In the active mode it is continuously tested whether enough mains voltage is available. This takes place in accordance with the program sequence according to FIG. 18. A capacitor having known capacitance is initially discharged 87. This could, for example, be the interference suppression capacitor 6. This capacitor is then recharged 88. The charging time is proportional to the voltage that is used for charging 89. If the voltage is too low, a comparator is deactivated 91 and the program sequence restarted. If the voltage is sufficient the comparator is activated 90.

Figure 17:
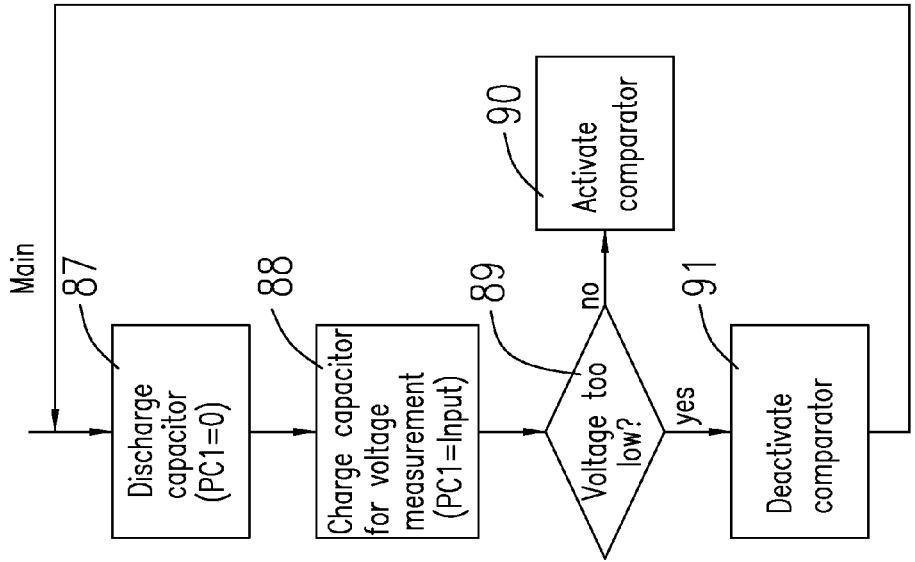

The comparator generates the signal "Flank" according to FIG. 17. When an adjustable voltage level has been exceeded, the signal Flank rising is generated, when it is fallen short of Flank falling is generated. An interrupt is triggered in each case and the program according to FIG. 17 is executed.

Figure 20:
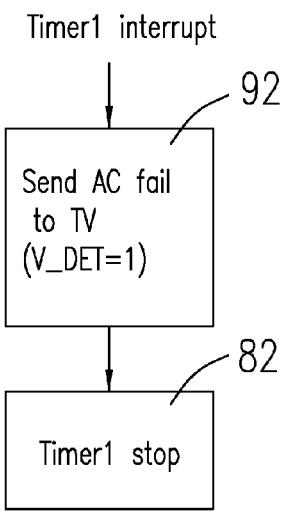

FIG. 17 shows the actions that are executed as soon as a change in the signal "Flank" occurs. First of all, Timer1, which is responsible for the input voltage timeout, is stopped (82) and then the flank of the comparator interrupt is evaluated (83). If it is rising, mains input voltage is available and this is communicated to the TV via V_DET=0 (85). Then the interrupt trigger time of Timer1 is set here to 9.4 ms (86). Within this time, a falling flank has to occur at the comparator, which again triggers an interrupt (FIG. 17 executed again). If the time is exceeded, the program according to FIG. 20 is executed. If the flank is falling, the timeout is set in this case to 4 ms (84). Within this timeout, a rising flank has to occur again (FIG. 17 executed again). Otherwise FIG. 20 is executed.

FIG. 20 is executed as soon as the mains input voltage is no longer available, in other words when no change in the flank is detected by the comparator. The TV is then notified via V_DET=1 (92) of the lack of an input voltage and the timeout counter Timer1 is stopped (82). As soon as mains voltage is again available, there is a change in the flank and FIG. 17 is again executed.

Figure 21:
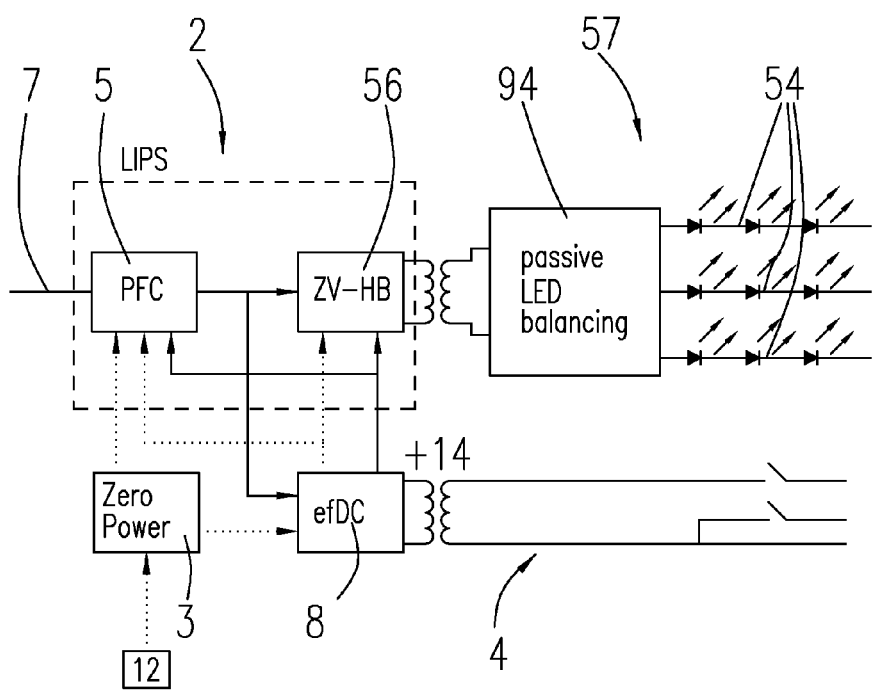

FIG. 21 shows an alternative embodiment of the television that substantially corresponds to FIG. 7. The PFC voltage divider 5 and the half-bridge converter 56 are disposed here in a common module LIPS. The backlight 57 has a plurality of light emitting diode strings 54. A current balancing network 94 ensures that the currents and thus the brightness in the individual light emitting diode strings 54 are uniform. The control signals between the individual modules are shown as dotted arrows and the voltage lines as continuous arrows.

Although the invention is described on the basis of a television, it is not limited to a television. On the contrary, it can be used in any electrical device that has a stand-by mode.

The invention can be particularly used in devices that have a lighting system with light emitting diodes. Alongside a flat-screen television, this could also include room or ceiling lighting using LEDs that are to be controlled using a remote control.

IDENTIFICATION REFERENCE LIST

1 Television
2 Power supply unit
3 Control unit
4 Television system unit
5 PFC circuit
6 Interference suppression capacitors
7 Mains voltage
8 Voltage converter
9 Microprocessor 10 Power supply
11 Signal receiver
12 Infrared transmitter
13-53 Procedural steps in the operating program
54 Light emitting diode string(s)
55 Rectifier
56 Half-bridge converter
57 Backlight
58 Flyback converter control module
59 Diode
60 Series capacitor
61 Blocking diode
62 Switch
63 Relay
64 FET
65-92 Procedural steps in the operating program
94 Current balancing network
96 Interference suppression capacitor circuit
Vi Intermediate voltage
STRT_OFF,
X-Switch Switching signal for suppression capacitor
XCAP_ON Switching signal for suppression capacitor
PWM_OUT Switching signal for start circuit (EV_ON)
DCDC_ON Switching signal for voltage converter (HV_OUT)
V_DET Voltage error signal
PS_OFF Television off signal

The invention claimed is:

1. An electrical device comprising a power supply unit (2) that has a voltage converter (8) and an interference suppression capacitor circuit (96) made up of at least one interference suppression capacitor (6, 60), and having a control unit (3) disposed on a primary side that has its own power supply circuit (10) directly connected to a mains voltage (7) and that can be controlled using an external signal (11), the electrical device (1) has an energy saving mode and the control unit (3) is configured to switch off the electrical energy on a secondary side of the power supply unit (2) when the electrical device (1) enters into the energy saving mode, the interference suppression capacitor circuit (96) is disposed on the primary side and the electrical device has at least one switch (62) to switch the interference suppression capacitor (6, 60) on or off or to change an overall capacitance of the interference suppression capacitor circuit (96).

2. An electrical device according to claim 1, wherein an additional series interference suppression capacitor (60) having lower capacitance is connected in series to the interference suppression capacitor (6) and the switch (62) is connected in parallel to the series interference suppression capacitor (60), so that when the switch (62) is open, the interference suppression capacitor (6) is connected in series to the series interference suppression capacitor (60).

3. An electrical device according to claim 1, wherein an additional interference suppression capacitor (60) having lower capacitance is connected in parallel to the interference suppression capacitor (6) and the switch (62) is configured to switch over between the two interference suppression capacitors.

4. An electrical device according to claim 1, wherein an additional interference suppression capacitor (60) having lower capacitance is connected in parallel to the interference suppression capacitor (6) and the interference suppression capacitor (6) and the additional interference suppression capacitor (60) each have one of the switches (62), so that interference suppression capacitors can be individually switched on and off.

5. An electrical device according to claim 1, wherein switching of the at least one switch (62) takes place at zero crossing of the mains voltage.

6. An electrical device according to claim 1, wherein the switch (62) is switched by the control unit (3) via a control signal (XCAP_ON).

7. An electrical device according to claim 1, wherein the voltage converter (8) has a flyback converter.

8. An electrical device according to claim 1, wherein the voltage converter (8) has a flyback converter and a half-bridge converter (56) both of which are controlled and switched by a common converter module (58).

9. An electrical device according to claim 1, wherein the voltage converter (8) has a converter module (58) having a start circuit and the power supply unit (2) has a switch to switch on or off the operating voltage (DCDC_ON) and one to switch on or off the start circuit (HV_OUT) of the converter module (58) respectively.

10. An electrical device according to claim 1, wherein the power supply unit (2) has a power factor correction circuit (5) and a switch to switch on or off the power factor correction circuit (STRT_OFF).

11. An electrical device according to claim 8, wherein the electrical device is a television set (4) having a backlighting system (57), the backlighting system has a backlight that is supplied with power through the half-bridge converter (56) and the television unit (4) through the flyback converter (8).

12. An electrical device according to claim 11, wherein the backlighting system (57) has light emitting diodes (54) as the backlight.

13. An electrical device according to claim 1, wherein the power supply (10) of the control unit (3) has a capacitive voltage divider that is connected to the mains voltage (7).

14. A method for controlling the stand-by mode of an electrical device according to claim 1, wherein on transition from zero power mode (ZPM) to an active mode (AM) of the electrical device (1), the interference suppression capacitor (6) is initially switched on or changed (23).

15. A method according to claim 14, wherein the voltage converter (8) has a flyback converter module, and a power supply of the flyback converter control module (26) is then switched on and afterwards a start cell of the flyback converter module (27) is activated.

16. A method according to claim 15, wherein voltage dividers of a power factor correction circuit (25) are switched on afterwards.

17. A method for controlling the stand-by mode of an electrical device according to claim 1, wherein on transition from an active mode (AM) to a zero power mode (ZPM), the interference suppression capacitor (6) is switched off or changed (45).

18. A method according to claim 17, wherein the voltage converter (8) has a flyback converter module, and a power supply of the flyback converter control module (41) is initially switched off and a start cell of the flyback converter module (40) is deactivated.

19. A method according to claim 18, wherein voltage dividers of a power factor correction circuit (5) are switched off (43).

20. A method according to claim 19, wherein before switching the interference suppression capacitor (6) a zero crossing (22; 44) of the AC voltage is awaited.

* * * * *